United States Patent
Nishida

(10) Patent No.: US 8,613,063 B2
(45) Date of Patent: Dec. 17, 2013

(54) INFORMATION PROCESSING APPARATUS, INFORMATION PROCESSING METHOD, AND RECORDING MEDIUM

(75) Inventor: Takayori Nishida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 743 days.

(21) Appl. No.: 12/232,083

(22) Filed: Sep. 10, 2008

(65) Prior Publication Data

US 2009/0070864 A1    Mar. 12, 2009

(30) Foreign Application Priority Data

Sep. 11, 2007   (JP) ................................ 2007-235225

(51) Int. Cl.
*H04L 29/06* (2006.01)

(52) U.S. Cl.
USPC ........... 726/7; 726/2; 726/5; 726/27; 358/1.2; 358/1.9; 358/1.14; 358/1.15; 455/410; 713/155; 713/165; 713/167; 713/176

(58) Field of Classification Search
USPC ........ 726/2, 5, 7, 27; 358/1.2, 1.9, 1.14, 1.15; 455/410; 713/155, 165, 167, 176
See application file for complete search history.

(56) References Cited

U.S. PATENT DOCUMENTS

| | | | | |
|---|---|---|---|---|
| 7,636,941 B2 * | 12/2009 | Blinn et al. | ...................... | 726/21 |
| 7,703,904 B2 | 4/2010 | Fujimaki | | |
| 2005/0172151 A1 * | 8/2005 | Kodimer et al. | .............. | 713/201 |
| 2005/0275887 A1 | 12/2005 | Yamanaka | | |
| 2006/0046691 A1 * | 3/2006 | Nishio | ........................... | 455/410 |
| 2006/0232795 A1 * | 10/2006 | Tsuboi et al. | .................. | 358/1.2 |
| 2006/0256370 A1 * | 11/2006 | Murakawa | .................... | 358/1.15 |
| 2007/0030511 A1 * | 2/2007 | Lee | ............................... | 358/1.15 |
| 2007/0103536 A1 | 5/2007 | Fujimaki | | |
| 2007/0282995 A1 * | 12/2007 | Mizuno et al. | ................ | 709/223 |
| 2008/0022087 A1 * | 1/2008 | Tsujimoto | ..................... | 713/155 |
| 2009/0070581 A1 * | 3/2009 | Shahindoust et al. | ........ | 713/168 |

FOREIGN PATENT DOCUMENTS

| | | | | |
|---|---|---|---|---|
| JP | 2006-019976 | | 1/2006 | |
| JP | 2006-099736 | | 4/2006 | |
| JP | 2007-125717 | | 5/2007 | |
| JP | 2007-184803 | * | 7/2007 | ............... H04N 1/00 |

OTHER PUBLICATIONS

Office Action for corresponding Japanese Patent Application No. 2007-235225 dated Nov. 1, 2011.

* cited by examiner

*Primary Examiner* — Brandon Hoffman
*Assistant Examiner* — Hee Song
(74) *Attorney, Agent, or Firm* — Harness, Dickey & Pierce P.L.C.

(57) ABSTRACT

An image forming apparatus receives authentication information about a user who requests a function and determines whether the user needs to be authenticated before executing the requested function. The image forming apparatus then transmits the authentication information to an authentication device that performs authentication of the user, and receives an authentication result from the authentication device indicative of whether the user is authentic. The image forming apparatus executes the function specified in the request only when the authentication result shows that the user is authentic.

17 Claims, 14 Drawing Sheets

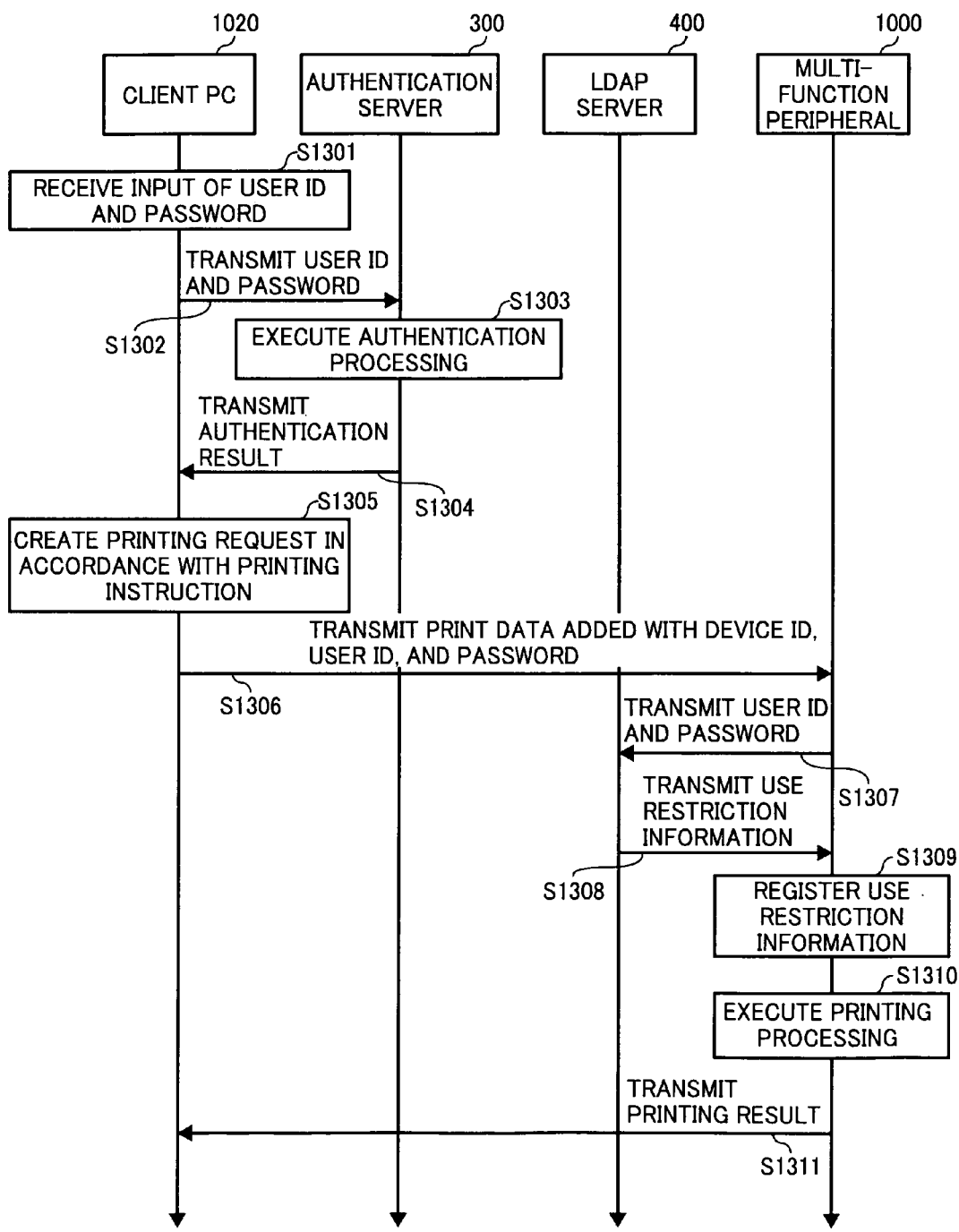

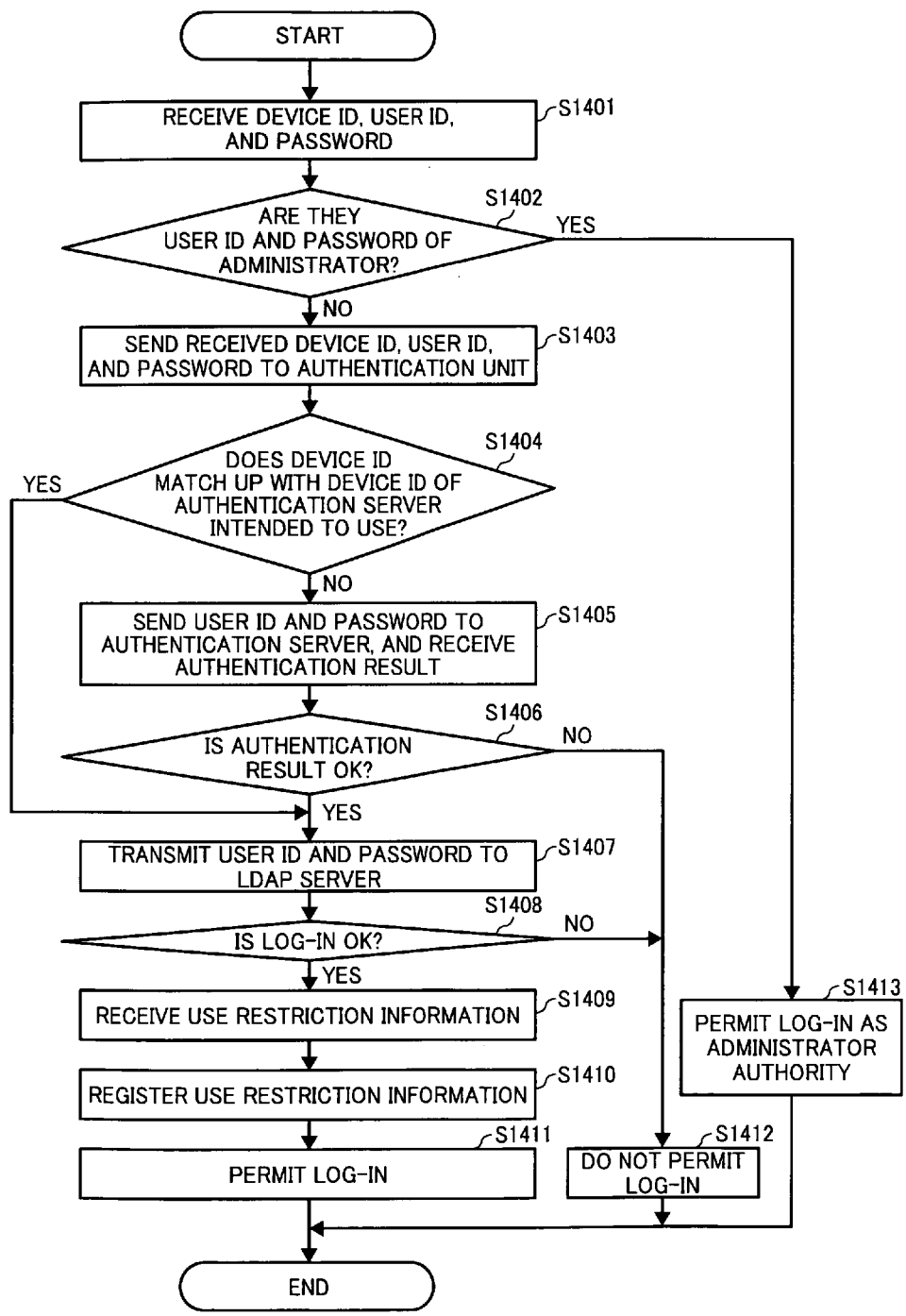

INFORMATION PROCESSING APPARATUS, INFORMATION PROCESSING METHOD, AND RECORDING MEDIUM

CROSS-REFERENCE TO RELATED APPLICATIONS

The present application claims priority to and incorporates by reference the entire contents of Japanese priority document 2007-235225 filed in Japan on Sep. 11, 2007.

BACKGROUND OF THE INVENTION

1. Field of the Invention

The present invention relates to a technology for providing a service relevant to image forming to a user.

2. Description of the Related Art

A document management system that manages various documents controls availability of use permission of a document by giving information that specifies an access right per document, which is generally called as an access control list (ACL). Japanese Patent Application Laid-open No. 2006-99736 proposes a technology for achieving a document management device that can reduce a load of renewal processing on an ACL that is required to be performed whenever there is a change in an organization, and can efficiently cope with the change in the organization.

On the other hand, a multi-function peripheral (MFP) that includes a plurality of functions, such as a photocopy function, a printer function, and a scanner function, can control availability of use permission per user with respect to each function or each of function details divided from each function. For example, the function details of the photocopy function can be full color, automatic color, bicolor, monocolor, and black-and-white. For example, the function details of the printer function can be color and black-and-white.

Specifically, such an MFP manages use restriction information that indicates availability of use permission per user with respect to each function, and can limit functions that a user can use in accordance with the use restriction information. Some MFPs have been configured to control such use restriction information with an external server, such as a lightweight directory access control (LDAP) server, to access the LDAP server every time when a user logs in the MFP, and to acquire use restriction information about the user who longs in.

An MFP that uses an LDAP server stores a user identification (ID) and a password, which are input by a user, into an authentication module of the MFP. That user ID and password are then used for both authentication processing using an external authentication server, and acquisition processing of use restriction information by accessing the LDAP server. Accordingly, each user can access both the authentication server and the LDAP server by inputting the user ID and the password only once, and can use functions of the MFP.

However, in the configuration that the authentication processing and acquisition processing of use restriction information are executed with the external authentication server and the external LDAP server, the processing may be repeatedly executed depending on a function used in the MFP.

When a function is requested from a client personal computer (PC), for example, in a case of the printer function, to begin with, it is assumed that a user has been already authenticated by an authentication server based on a user ID and a password input by the user when logging in the client PC. As the authenticated user specifies printing of a document, an execution of the printer function is then requested to the MFP.

However, when the execution of the printer function is requested from the client PC, the MFP again executes authentication of the user by the authentication server by using the user ID and the password that are transmitted with data to be printed. In other words, there is a possibility that the authentication processing at the log-in to the client PC, and the authentication processing at the request of a function of the MFP from the client PC are repeatedly executed.

However, a function among functions of an MFP that a user requests by directly operating an operation panel of the MFP, such as the photocopy function, the scanner function, or a facsimile function, does not have such problem.

SUMMARY OF THE INVENTION

It is an object of the present invention to at least partially solve the problems in the conventional technology.

According to an aspect of the present invention, there is provided an image forming apparatus configured to be connected via a network to an authentication device that authenticates users of the image forming apparatus, and serves various functions relevant to image forming to authentic users. The image forming apparatus includes a request receiving unit that receives a request for use of a desired function and authentication information about a user who made the request; a determining unit that determines whether the user needs to be authenticated based on a category of the desired function; a transmitting unit that transmits the authentication information to the authentication device when the determining unit determines that the user needs to be authenticated; a result receiving unit that receives an authentication result from the authentication device indicative of whether the user is authentic; and an executing unit that determines whether the user is authentic based on the authentication result and executes the desired function upon determining that the user is authentic.

According to another aspect of the present invention, there is provided an image forming method to be implemented on an image forming apparatus configured to be connected via a network to an authentication device that authenticates users of the image forming apparatus, and serves various functions relevant to image forming to authentic users. The image forming method includes request receiving including receiving a request for use of a desired function and authentication information about a user who made the request; need determining including determining whether the user needs to be authenticated based on a category of the desired function; transmitting the authentication information to the authentication device when it is determined at the need determining that the user needs to be authenticated; result receiving including receiving an authentication result from the authentication device indicative of whether the user is authentic; authentication determining including determining whether the user is authentic based on the authentication result; and executing the desired function when it is determined at the authentication determining that the user is authentic.

According to still another aspect of the present invention, there is provided a computer readable medium that records thereon an image forming program that causes a computer to execute the above image forming method.

According to still another aspect of the present invention, there is provided an image forming system that includes a client terminal configured to be used by a user, and an image forming apparatus configured to be connected via a network to an authentication device that authenticates users of the image forming apparatus, and serves various functions relevant to image forming to authentic users. The client terminal includes a request creating unit that creates a request for use of a function and includes authentication information about a user who made the request and a device ID unique to the authentication device; and a transmitting unit that transmits the request to the image forming apparatus. The image forming apparatus includes a request receiving unit that receives the request from the client terminal; a determining unit that determines whether the device ID included in the request matches with a device ID unique to the authentication device, and determines that the user needs to be authenticated when the two do not match; a transmitting unit that transmits the authentication information to the authentication device when the determining unit determines that the user needs to be authenticated; a result receiving unit that receives an authentication result from the authentication device indicative of whether the user is authentic; and an executing unit that determines whether the user is authentic based on the authentication result and executes the desired function upon determining that the user is authentic.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a sequence diagram of a general flow of image forming processing when requesting a printer function according to the second embodiment; and FIG. 14 is a flowchart of a general flow of log-in processing according to the second embodiment.

DETAILED DESCRIPTION OF THE PREFERRED EMBODIMENTS

Exemplary embodiments of the present invention will be explained below in detail with reference to the accompanying drawings. The embodiments described below are explained by using an example of an image forming apparatus applied to a multi-function peripheral that accommodates a printer function, a photocopy function, a facsimile function, and a scanner function into a housing. However, the present invention is not limited to such multi-function peripheral, and can also be applied to other image forming apparatuses, such as, a photocopier, a copying machine, a facsimile, and a scanner.

An image forming apparatus according to a first embodiment of the present invention determines whether authentication needs to be performed by an authentication server based on a function identification (ID) for identifying a function requested to be executed.

Figure 1:
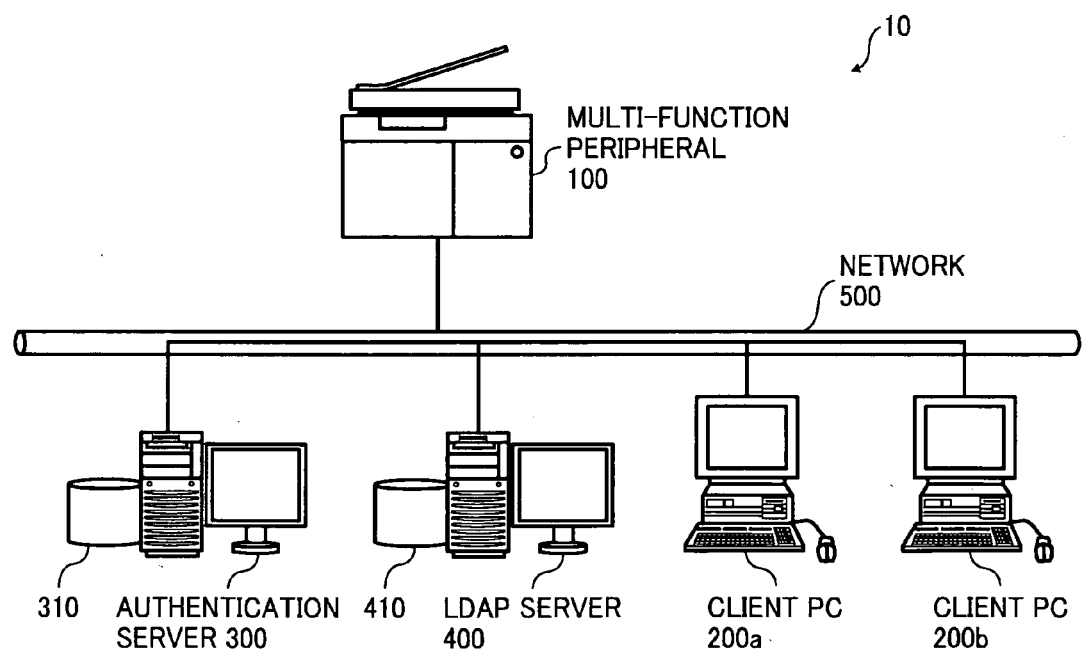
FIG. 1 is a schematic diagram of a network configuration of an image forming system according to a first embodiment of the present invention.

As shown in FIG. 1, an image forming system 10 according to the first embodiment includes a multi-function peripheral 100 as an image forming apparatus, a plurality of client personal computers (PCs) 200a and 200b, an authentication server 300 as an authentication device, and a lightweight directory access protocol (LDAP) server 400. All these units are connected to each other via a network 500 such as a local area network (LAN), an intranet, an Ethernet (registered trademark), or the Internet.

An arbitrary one of the client PCs 200a and 200b will be called as a client PC 200. The client PC 200 requests a function of the multi-function peripheral 100 via the network 500. The client PC 200 prepares and sends a request to print a document to the multi-function peripheral 100 by using text editor software.

The client PC 200 can remotely access to the multi-function peripheral 100 and can use a function of the multi-function peripheral 100 by using a protocol, for example, a hypertext transfer protocol (HTTP), a file transfer protocol (FTP), or Telnet. The client PC 200 transmits to the authentication server 300 a user ID and a password both of which are input by a user when the user logs in the client PC 200, and the user can use the client PC 200 only when the user ID and the password are authenticated, i.e., determined to be authentic, by the authentication server 300.

The number of the client PCs 200 is not limited to two. In other words, the image forming system 10 can be configured to include three or more the client PCs. The configuration of the client PC 200 will be described later in detail.

The authentication server 300 authenticates a user in response to a request from an external device, such as the multi-function peripheral 100, and the client PC 200. The authentication server 300 includes a storage unit 310 that stores therein authentication information including a user ID by which a user is identified, and a password. Moreover, the authentication server 300 receives from an external device authentication information including a user ID and a password input by a user, and authenticates the user by verifying the received authentication information against the authentication information stored in the storage unit 310. The authentication method used by the authentication server 300 is not limited to the method of using a user ID and a password. That is, the authentication server 300 can use some other method, such as a biometrics authentication method by using, for example, a fingerprint.

The LDAP server 400 is operated by adherence to the LDAP, and manages use restriction information per user. For this purpose, the LDAP server 400 includes a storage unit 410 that stores therein required information. The required information includes, although not limited, a user ID and use restriction information corresponding to the user ID. The required information can include, although not limited, a user ID, use restriction information corresponding to the user ID, and user information corresponding to the user ID. The user information can include, although not limited, an e-mail address and/or a facsimile number of a user.

Availability of use permission for each of functions, such as a photocopy function, a scanner function, a comma separated value (CSV) output function, a printer function, and a facsimile function, is set in use restriction information. When each function is divided into function details, availability of use permission per function detail can be set as use restriction information. For example, in a case of the photocopy function, which mode of photocopying to be permitted can be set from among full color, automatic color, bicolor, monocolor, and black-and-white. Moreover, for example, in a case of the printer function, which mode of printing to be permitted can be set from among color and black-and-white.

For example, when the use of a function is permitted, "1" is set in use restriction information, while the use is not permitted, "0" is set. The management method of use restriction information is not limited to this. Any method can be applied as long as availability of use permission per function can be set by the method, for example, a method of setting only the name of a function of which the use is to be permitted, or the function ID for identifying the function.

Figure 2:
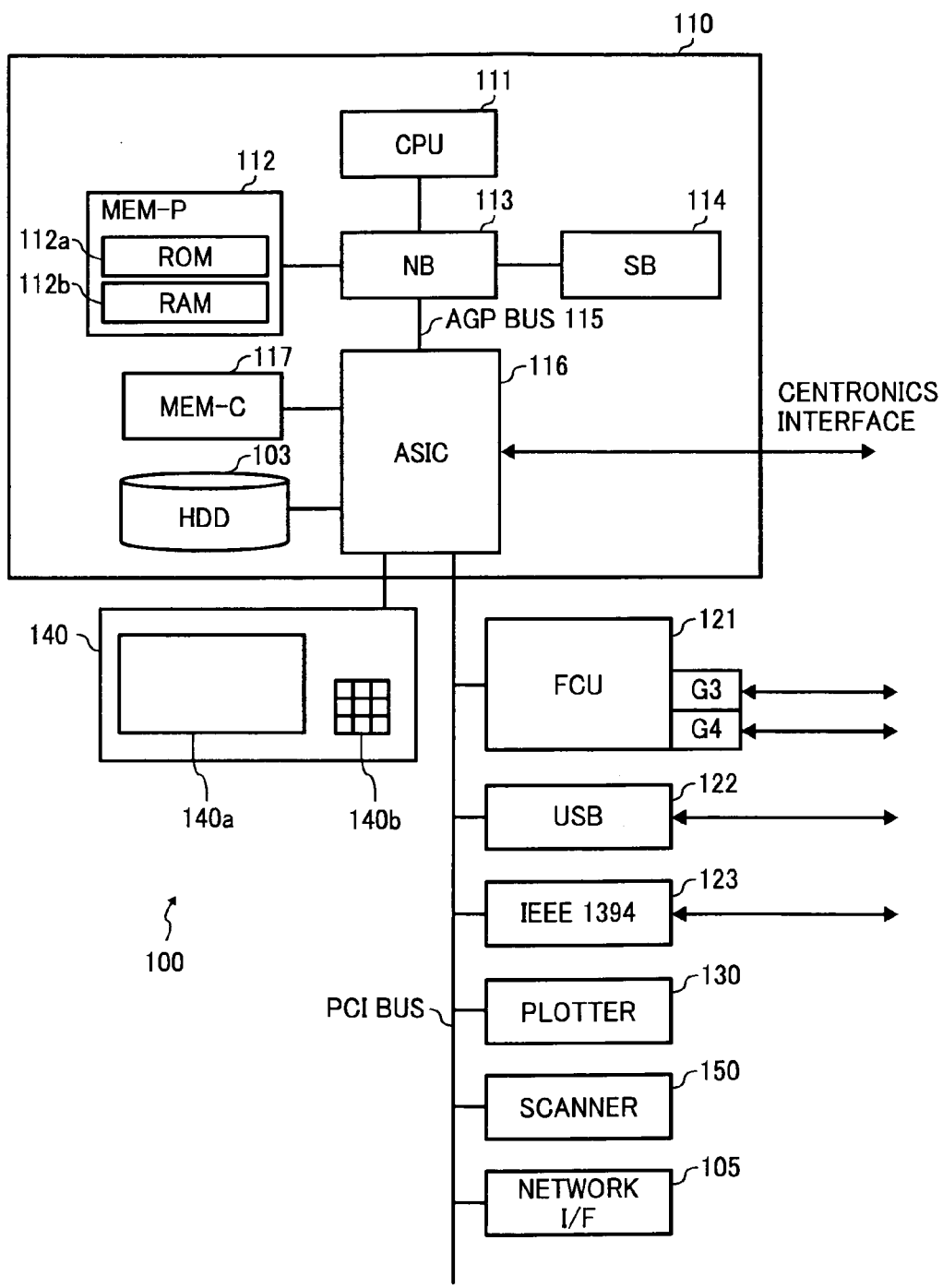
FIG. 2 is a block diagram of a hardware configuration of a multi-function peripheral shown in FIG. 1.

A hardware configuration of the multi-function peripheral 100 is explained below. As shown in FIG. 2, the multi-function peripheral 100 has a configuration in which a controller 110, a plotter 130, and a scanner 150 are connected to each other with a peripheral component interconnect (PCI) bus. The controller 110 performs overall control over the multi-function peripheral 100, and controls drawing, communication, and input from an operation panel 140. The plotter 130 and the scanner 150 include image processing functions, such as error diffusion and gamma transformation. The operation panel 140 includes an operation display unit 140a and a keyboard unit 140b. The operation display unit 140a displays on a liquid crystal display (LCD) original image information about an original read by the scanner 150, and receives input from an operator via a touch panel. The keyboard unit 140b receives key input from an operator.

The controller 110 includes a central processing unit (CPU) 111, a system memory (MEM-P) 112, a north bridge (NB) 113, a south bridge (SB) 114, an application specific integrated circuit (ASIC) 116, a local memory (MEM-C) 117, and a hard disk drive (HDD) 103, and the NB 113 and the ASIC 116 are connected to each other with an accelerated graphics port (AGP) bus 115. The MEM-P 112 further includes a read only memory (ROM) 112a, and a random access memory (RAM) 112b.

The CPU 111 performs overall control over the multi-function peripheral 100, includes a chip set that includes the NB 113, the MEM-P 112, and the SB 114, and is connected to other devices via the chip set.

The NB 113 is a bridge for connecting the CPU 111, the MEM-P 112, the SB 114, and the AGP bus 115, and includes a memory controller that controls reading and writing to the MEM-P 112, a PCI master, and an AGP target.

The MEM-P 112 is a system memory to be used as a storage memory for a computer program and data, a development memory for a computer program and data, and a drawing memory of a printer, and includes the ROM 112a and the RAM 112b. The ROM 112a is a read only memory to be used as a storage memory for a computer program and data for controlling operation of the CPU 111. The RAM 112b is a writable and readable memory to be used as a development memory for a computer program and data, and a drawing memory of a printer.

The SB 114 is a bridge for connecting the NB 113 to a PCI device and a peripheral device. The SB 114 is connected to the NB 113 via a PCI bus, and a network interface (I/F) 105 is also connected to the PCI bus.

The ASIC 116 is an integrated circuit (IC) for an image processing use including a hardware element that processes an image, and has a role of a bridge that connects the AGP bus 115, the PCI bus, the HDD 103, and the MEM-C 117 to one another. The ASIC 116 includes a PCI target and an AGP master, an arbiter (ARB) that is the core of the ASIC 116, a memory controller that controls the MEM-C 117, a plurality of direct memory access controllers (DMAC) that perform processing of data, such as turning of image data, with a hardware logic circuit, and a PCI unit that transfers data between the plotter 130 and the scanner 150 via the PCI bus. The ASIC 116 is connected to a fax control unit (FCU) 121, a universal serial bus (USB) 122, and an Institute of Electrical and Electronics Engineers 1394 (IEEE 1394) interface 123 via the PCI bus.

The MEM-C 117 is a local memory to be used as an image buffer for photocopy and a code buffer. The HDD 103 is a storage that stores therein image data, a computer program of controlling operation of the CPU 111, font data, and forms.

The AGP bus 115 is a bus interface for a graphics accelerator card that is proposed to accelerate graphics processing, and configured to achieve faster processing with a graphics accelerator card by directly accessing the MEM-P 112 in a high throughput.

Figure 3:
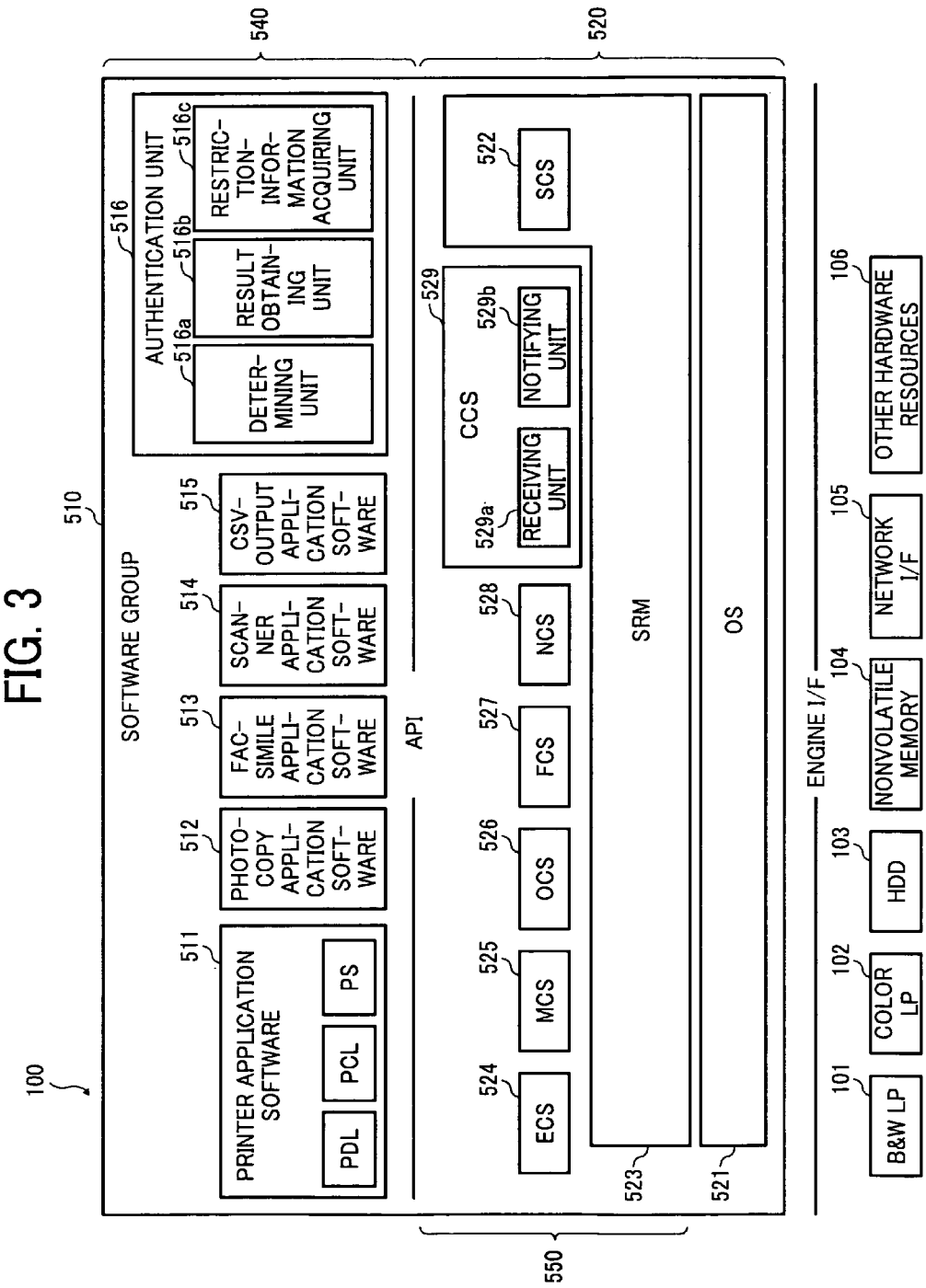
FIG. 3 is a functional block diagram of a general configuration of the multi-function peripheral shown in FIG. 1.

A general configuration of the multi-function peripheral 100 is explained below. As shown in FIG. 3, the multi-function peripheral 100 includes a black-and-white line printer (B&W LP) 101, a color line printer (color LP) 102, the HDD 103, a nonvolatile memory 104, the network I/F 105, the scanner 150, and hardware resources 106, such as a facsimile or a memory, and a software group 510. The software group 510 includes a platform 520 and application software 540.

The platform 520 includes control services 550, a system resource manager (SRM) 523, and an operating system (OS) 521. The control services 550 interpret a processing request from the application software 540, and create a request to obtain a hardware resource. The SRM 523 controls one or more hardware resources, and coordinates an obtainment request from the control services 550.

The control services 550 are configured to include one or more service modules, such as a system control service (SCS) 522, an engine control service (ECS) 524, a memory control service (MCS) 525, an operation-panel control service (OCS) 526, a fax control service (FCS) 527, a network control service (NCS) 528, and an authentication control service (CCS) 529.

The platform 520 is configured to include an application program interface (API) via which a processing request from the application software 540 can be received by using a predefined function.

The OS 521 is a general purpose operating system, such as UNIX (registered trademark), and executes software programs of the platform 520 and the application software 540 in parallel as a process.

The process of the SRM 523 is configured to control the system and to manage the resources with the SCS 522. For example, according to the process of the SRM 523, the use of hardware resources of the scanner 150 or the plotter 130, such as an engine, a memory, an HDD file, and a host input/output (I/O) (for example, a Centronics interface, the network I/F 105, the IEEE 1394 interface 123, or an RS-232C interface), is coordinated in accordance with a request from software in the upper layer, and executed and controlled.

Specifically, the SRM 523 determines whether a requested hardware resource is available (not used in response to any other request), and if available, the SRM 523 notifies software in the upper layer that the requested hardware resource is available. Moreover, the SRM 523 arranges schedules of the use of the hardware resources in response to a request from software in the upper layer, and then, for example, a printer engine directly performs request details, such as a paper delivery, an image producing operation, a memory allocation, and a file creation.

The process of by the SCS 522 is configured to perform application program control, operation unit control, system screen display, light emitting diode (LED) indication, resource management, and interrupt application program control.

The process of the ECS 524 is configured to control engines of the B&W LP 101, the color LP 102, the HDD 103, the scanner 150, and the hardware resources 106 including, for example, a facsimile.

The process of the MCS 525 is configured to perform acquisition and release of an image memory, use of the HDD 103, and compression and expansion of image data.

The OCS 526 is configured to perform control over an operation panel (the operation panel 140) that is to become an information communication unit between an operator (user) and main-body control. The OCS 526 includes an OCS process and an OCS library. The OCS process acquires a key press (or a touch) as a key event from the operation panel 140, and transmits a key-event function corresponding to the acquired key to the SCS 522. The OCS library includes preliminarily registered functions, such as a drawing function for drawing various screens in response to a request from one of the application software 540 or the control services 550 and displaying a drawn screen on the operation panel 140, and other functions for controlling the operation panel 140.

The OCS library is implemented as linked to the application software 540 and each module of the control services 550. The whole of the OCS 526 can be configured to operate as the process, or the whole of the OCS 526 can be configured as the OCS library.

The process of the FCS 527 provides application software for performing facsimile transmission and reception by using a public switched telephone network (PSTN) or an integrated services digital network (ISDN), registration of and reference to facsimile data managed in a backup static random access memory (SRAM) (BKM), facsimile reading, received facsimile printing, and combined transmission and reception, from each application software layer of the system controller.

The NCS 528 is a process configured to provide a service to be shared and used by the application software on the multi-function peripheral 100 that requires network I/O, such as scanner application software 514. The NCS 528 performs processing of distributing data received from the network side to respective application software, and intermediate processing when transmitting data from application software to the network side. Specifically, the NCS 528 includes server daemons, such as ftpd, httpd, lpd, snmpd, telnetd, and smtpd, and client functions of those protocols.

The CCS 529 is a process configured to perform processing related to authentication of a user who uses the multi-function peripheral 100, and executes processing of managing use restriction information per user with respect to each function. The CCS 529 includes a receiving unit 529a, and a notifying unit 529b.

The receiving unit 529a receives authentication information, such as a user ID and a password for authenticating a user, from other components in the multi-function peripheral 100. The notifying unit 529b receives a function ID for identifying a function of a component of an authentication request source. The received function ID, the received user ID, and the received password are passed to an authentication unit 516, which will be described later, and used for determination of the need for authentication, and actual authentication processing.

The notifying unit 529b notifies a component of an authentication request source about an authentication result of a user received from the authentication unit 516, and use restriction information per user.

The application software 540 includes printer application software 511 for a printer that includes a page description language (PDL), a processor control language (PCL), and a PostScript (PS), photocopy application software 512 for a photocopy, facsimile application software 513 for a facsimile, the scanner application software 514 for a scanner, and CSV-output application software 515 for a document box that outputs image data to the HDD 103, and the authentication unit 516.

The authentication unit 516 executes authentication processing of a user by using the authentication server 300, and processing of acquiring use restriction information from the LDAP server 400. The authentication unit 516 includes a determining unit 516a, a result obtaining unit 516b, and a restriction-information acquiring unit 516c.

The determining unit 516a determines whether authentication needs to be performed by the authentication server 300 in accordance with a category of a requested function. Specifically, the determining unit 516a determines the need for authentication by determining whether a function ID received from the CCS 529 is the function ID of a predetermined specific function. For example, when a received function ID is the function ID of the printer application software 511, the determining unit 516a determines that authentication does not need to be performed by the authentication server 300.

The method of determining the need for authentication by the determining unit 516a is not limited to this, and any method can be applied as long as a category of a requested function can be identified, and the need for authentication can be determined in accordance with the category by the method.

The result obtaining unit 516b transmits a user ID and a password to the authentication server 300, and receives an authentication result about the transmitted user ID and the password from the authentication server 300.

The restriction-information acquiring unit 516c transmits a user ID and a password to the LDAP server 400, and receives use restriction information associated with the transmitted user ID and the password from the LDAP server 400.

Each of the processes of the application software 540 and the control services 550 implements a user service related to image forming processing, such as a photocopy, a printer, a scanner, and a facsimile, while performing communication between the processes by calling a function, transmitting its return value, and transmitting and receiving messages.

In this way, a plurality of the application software 540 and a plurality of the control services 550 are present in the multi-function peripheral 100, and each of them operates as a process. One or more threads are created in each of the processes, and the processes are executed per thread in parallel. The control services 550 provide a common service to the application software 540, thereby providing a user service related to image forming processing, such as a photocopy, a printer, a scanner, or a facsimile, while performing parallel operations of a number of processes and parallel operations of threads, and operating in a cooperated manner by communicating between the processes.

Figure 4:
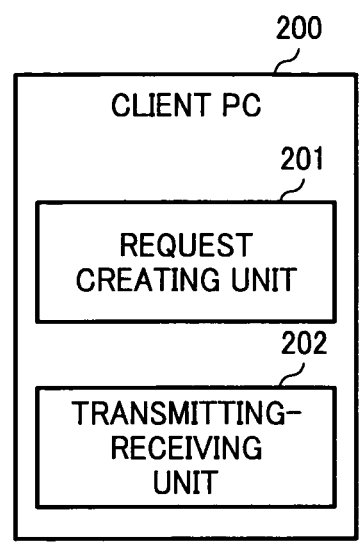
FIG. 4 is a functional block diagram of a client personal computer (PC) shown in FIG. 1.

A configuration of the client PC 200 is explained below. As shown in FIG. 4, the client PC 200 includes a request creating unit 201 and a transmitting-receiving unit 202.

The request creating unit 201 creates an execution request for each function of the multi-function peripheral 100. An execution request includes data required for an execution of each function, and a user ID and a password that are input when logging in the client PC 200. For example, when requesting an execution of the printer function, the request creating unit 201 creates an execution request including printer data, a user ID, and a password.

For example, when remotely accessing the multi-function peripheral 100, the request creating unit 201 can be configured with software for remote access, such as a Web browser, a file transfer protocol (FTP) client, or a Telnet client. In such case, the software is configured to create an execution request including a user ID and a password to be used for log-in by remote access.

The transmitting-receiving unit 202 performs transition and reception of a message with other devices including the multi-function peripheral 100. For example, the transmitting-receiving unit 202 transmits an execution request created by the request creating unit 201 to the multi-function peripheral 100. Moreover, the transmitting-receiving unit 202 receives an execution result about the execution request from the multi-function peripheral 100.

Image forming processing performed by the image forming system 10 configured in this way is explained below. First of all, an outline of the image forming processing is explained by dividing the processing into three cases, namely, a case (1) when requesting the printer function, a case (2) when requesting the photocopy function, the scanner function, or the facsimile function, and a case (3) of remote access.

Figure 5:
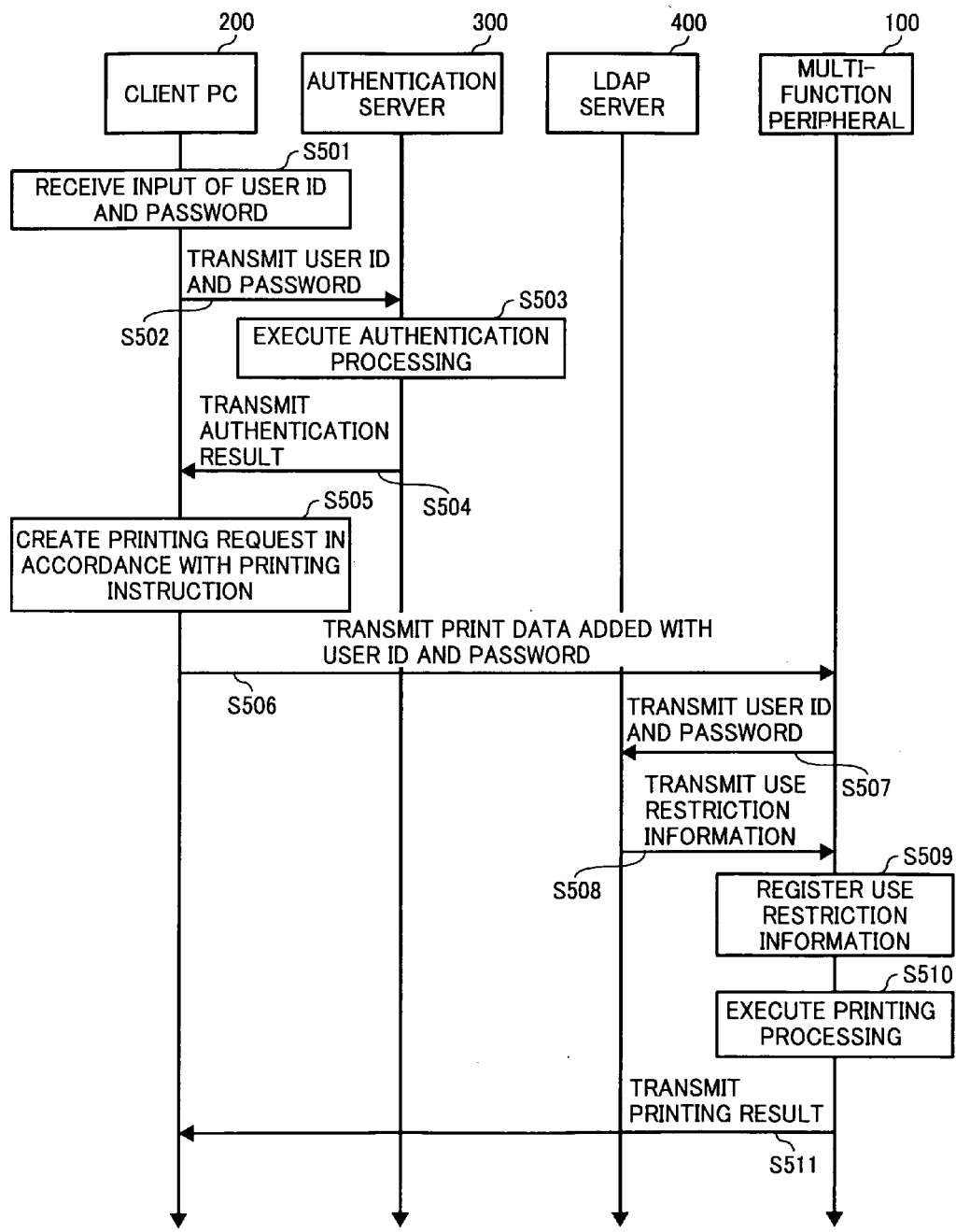
FIG. 5 is a sequence diagram of a general flow of image forming processing when requesting a printer function according to the first embodiment.

FIG. 5 is a sequence diagram of a general flow of the image forming processing in the case (1) when requesting the printer function.

To begin with, the client PC 200 receives input of a user ID and a password by a user (Step S501). The client PC 200 then transmits the input user ID and the input password to the authentication server 300 (Step S502).

The authentication server 300 executes authentication processing of the user by verifying the transmitted user ID and the transmitted password against information stored in the storage unit 310 (Step S503). The authentication server 300 then transmits an authentication result to the client PC 200 (Step S504).

Although omitted in the figure, if an authentication result indicating that the user is not authenticated is returned, an error message is displayed, and error processing is to be executed, for example, retyping of a user ID and a password is required.

When the user is authenticated, the user logs in the client PC 200, and can use software, such as text editor software. Suppose the user gives an instruction to print a document through the text editor software, the request creating unit 201 creates an execution request for printing processing in accordance with the printing instruction (Step S505). In this case, the request creating unit 201 creates an execution request including print data added with the user ID and the password.

The transmitting-receiving unit 202 then transmits the created execution request to the multi-function peripheral 100 (Step S506).

The multi-function peripheral 100 receives the execution request from the client PC 200. The multi-function peripheral 100 determines that authentication by the authentication server 300 is not needed because the received execution request is a request for printing processing, and transmits the user ID and the password included in the execution request to the LDAP server 400 to acquire use restriction information (Step S507).

Thus, according to the first embodiment, it is determined whether authentication is needed in accordance with a category of a requested function, and the authentication is executed only when it is needed. Accordingly, repetition of processing can be avoided and a processing burden can be reduced. The method of determining the need for authentication will be described later.

The LDAP server 400 that receives the user ID and the password performs authentication of the user based on the user ID and the password. When the user is authenticated, the LDAP server 400 acquires use restriction information associated with the user ID of the authenticated user from the storage unit 410, and transmits the acquired use restriction information to the multi-function peripheral 100 (Step S508).

The multi-function peripheral 100 registers the transmitted use restriction information to a storage unit, such as the MEM-C 117 (Step S509). When the printer function is permitted within the use restriction information, the multi-function peripheral 100 executes printing processing in response to the request (Step S510). Although omitted in the figure, if the use restriction information does not include a condition to permit the printer function, the multi-function peripheral 100 transmits, for example, an error message, to the client PC 200.

After the printing processing, the multi-function peripheral 100 transmits a printing result to the client PC 200 (Step S511), and terminates the image forming processing.

An outline of the image forming processing in the case (2) when requesting the photocopy function, the scanner function, or the facsimile function is explained below with reference to FIG. 6.

To begin with, the multi-function peripheral 100 receives input of a user ID and a password by a user via the operation panel 140 (Step S601). The multi-function peripheral 100 then transmits the input user ID and the input password to the authentication server 300 (Step S602).

The authentication server 300 executes authentication processing of the user by verifying the transmitted user ID and the transmitted password against information stored in the storage unit 310 (Step S603). The authentication server 300 then transmits an authentication result to the multi-function peripheral 100 (Step S604).

When the user is authenticated, furthermore, restriction information is acquired from the LDAP server 400 to specify an available function permitted for the authenticated user.

Processes of acquiring and registering use restriction information from Step S605 to Step S607 are similar to the processes from Step S507 to Step S509 shown in FIG. 5, therefore explanations of them are omitted.

After the use restriction information is acquired, the multi-function peripheral 100 sets only a function of which use is permitted within the use restriction information to an available state (Step S608). Accordingly, the user can use a permitted function among the photocopy function, the scanner function, and the facsimile function.

In this way, with respect to a function directly requested from the operation panel 140 of the multi-function peripheral 100, authentication processing by the authentication server 300 is executed. Unlike the printer function, it is not assumed that the user is authenticated by the client PC 200 in advance.

Figure 7:
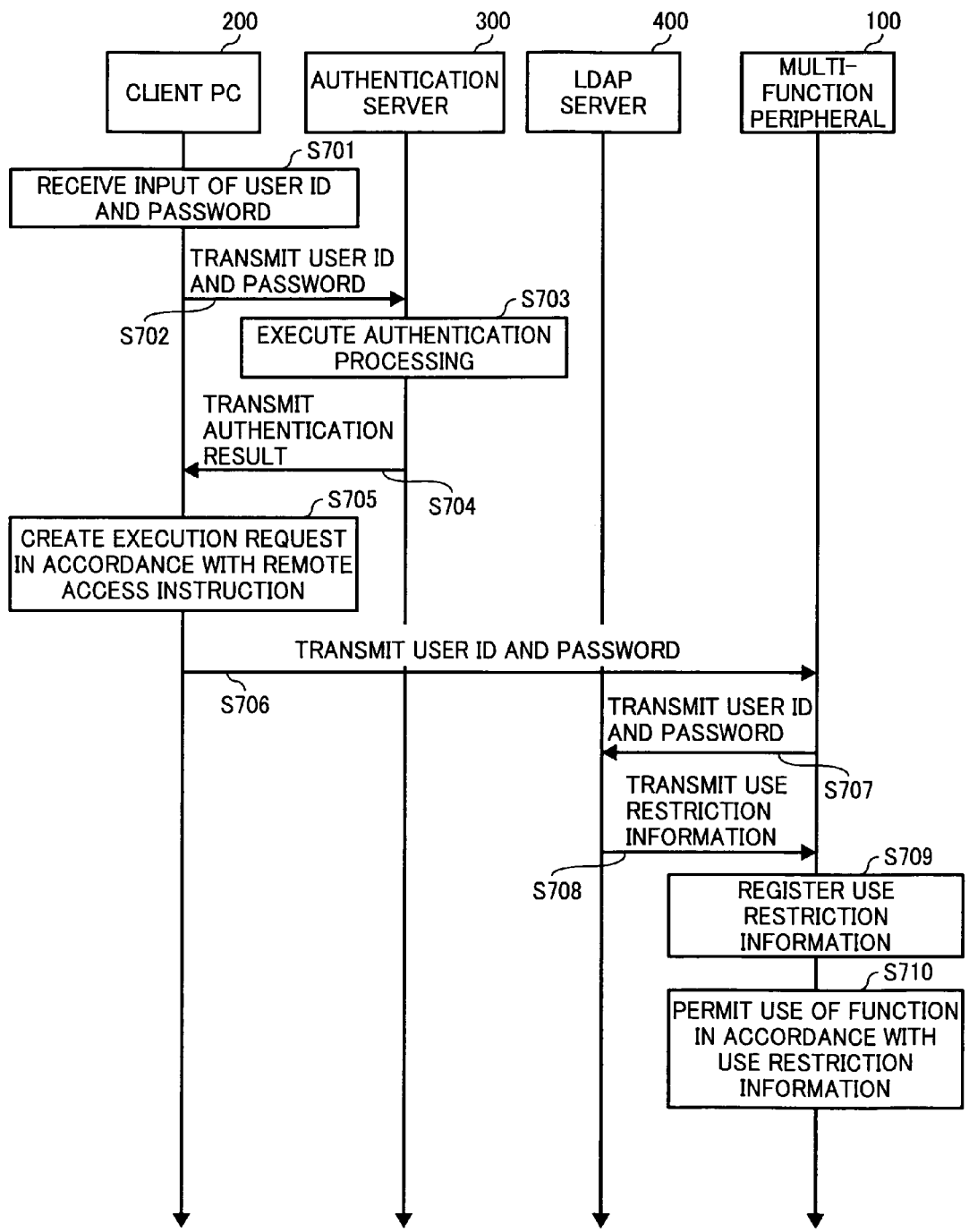
FIG. 7 is a sequence diagram of a general flow of image forming processing through remote access according to the first embodiment.

An outline of the image forming processing in the case (3) of remote access is explained below with reference to FIG. 7.

Processes of user authentication processing from Step S701 to Step S704 are similar to the processes from Step S501 to Step S504 shown in FIG. 5, therefore explanations of them are omitted.

When the user is authenticated, the user logs in the client PC 200, and can use software for remote access, such as a Web browser, a FTP client, or a Telnet client. Suppose the user instructs the client PC 200 to obtain a remote access to the multi-function peripheral 100 by operating the software for remote access, the request creating unit 201 creates an execution request for remote access in accordance with the remote access instruction (Step S705). In this case, the request creating unit 201 creates an execution request for remote access including the user ID and the password.

The transmitting-receiving unit 202 then transmits the created execution request to the multi-function peripheral 100 (Step S706).

The multi-function peripheral 100 determines that authentication by the authentication server 300 is not needed because the received execution request is a request for remote access, and transmits the user ID and the password included in the execution request to the LDAP server 400 to acquire use restriction information (Step S707).

In this way, similarly to a printing request, a remote access request is also requested from the client PC 200 that has authenticated the user, so that authentication processing at the multi-function peripheral 100 can be omitted. In other words, repetition of processing can be avoided and a processing burden can be reduced.

Processes of acquiring and registering use restriction information from Step S707 to Step S709 are similar to the processes from Step S507 to Step S509 shown in FIG. 5, therefore explanations of them are omitted.

After the use restriction information is acquired, the multi-function peripheral 100 sets only a function of which use is permitted within the use restriction information to an available state (Step S710). Accordingly, the user can use only a permitted function via remote access.

Details of log-in processing to the multi-function peripheral 100 including determination of the need for authentication are explained below with reference to FIG. 8.

Figure 8:
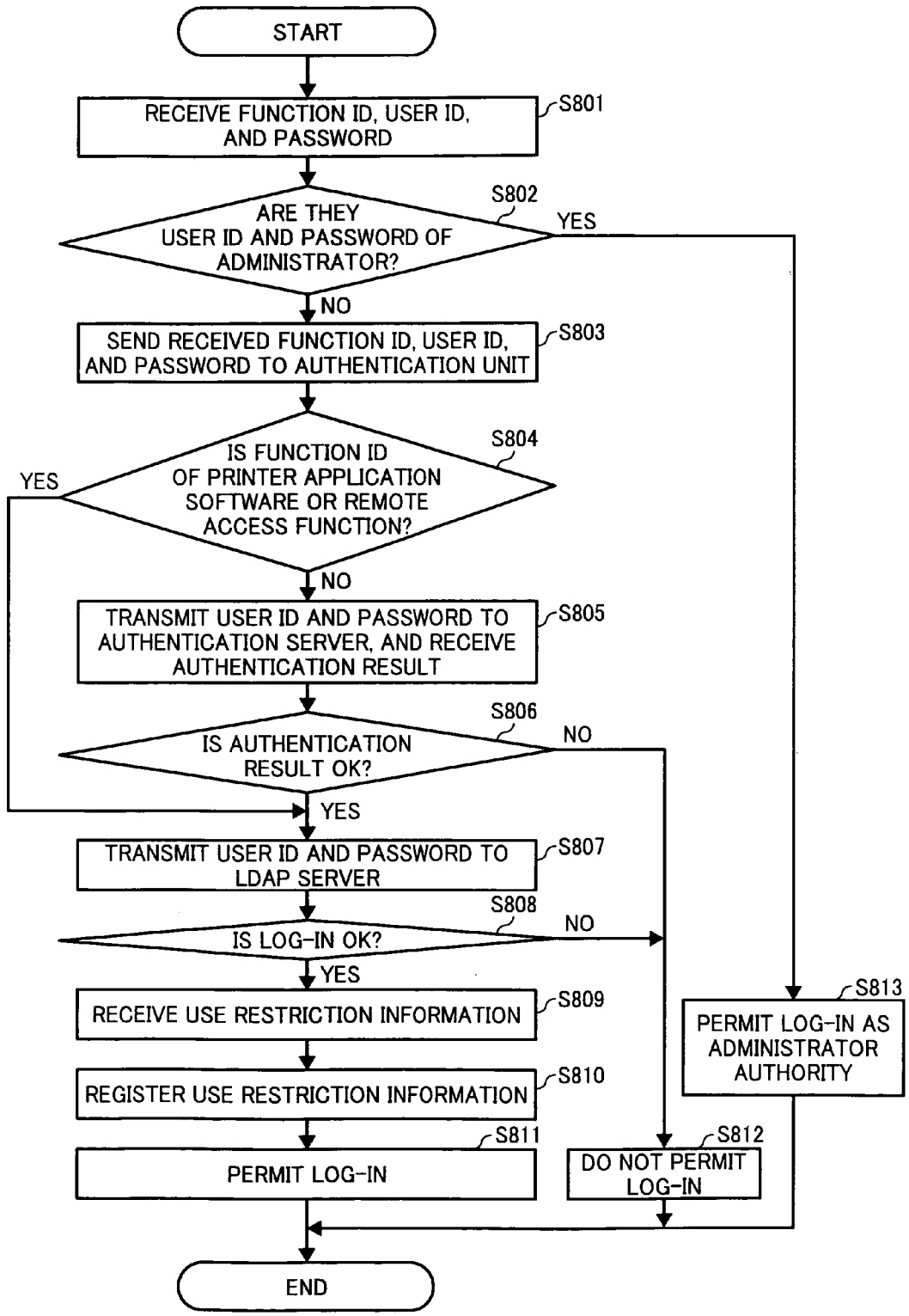
FIG. 8 is a flowchart of a general flow of log-in processing according to the first embodiment.

The log-in processing shown in FIG. 8 corresponds to processing of receiving an input user ID and an input password via the operation panel 140 of the multi-function peripheral 100 or at the client PC 200, performing authentication by the authentication server 300 as needed, and acquiring use restriction information. In other words, the processing mainly from Step S506 to Step S509 shown in FIG. 5, from Step S601 to Step S607 shown in FIG. 6, and from Step S706 to Step S709 shown in FIG. 7, is detailed in the log-in processing.

To begin with, the receiving unit 529a in the CCS 529 receives a function ID for identifying a requested function, an input user ID, and an input password (Step S801). For example, suppose printing is requested from the client PC 200, the receiving unit 529a receives a function ID, a user ID, and a password as described below.

First of all, when an execution request is transmitted from the client PC 200, the NCS 528 receives the execution request. The NCS 528 then distributes the received execution request to the printer application software 511, because the received execution request is a printing request. The printer application software 511 sends to the CCS 529 a predefined function ID indicating that it is the printer application software 511, and the user ID and the password both of which are included in the execution request, to request authentication of a user who requests printing. The receiving unit 529a receives the sent function ID, the sent user ID, and the sent password in this way.

By contrast, suppose a function is requested from the operation panel 140, the receiving unit 529a receives an input user ID and an input password from the SCS 522 that controls the operation panel 140. Because screens on which a user ID and a password are input vary from function to function that is requested, the SCS 522 can send a function ID of a function associated with each screen to the receiving unit 529a. In this way, the receiving unit 529a can receive the function ID of the requested function, the user ID, and the password.

By contrast, suppose remote access is requested, the receiving unit 529a receives a user ID and a password input on the client PC 200 via a server daemon in the NCS 528 appropriate to a protocol for requested remote access. Moreover, the receiving unit 529a receives a function ID indicating the remote access function from the server daemon.

A method of receiving a function ID is not limited to this, and any method can be applied as long as the receiving unit 529a can specify the function ID of a request source by the method. For example, if a function of executing remote access is implemented as an application program in the application software 540, it can be configured to receive a function ID from the application program.

The CCS 529 then determines whether the received user ID and the received password are the user ID and the password of an administrator by verifying them against user ID(s) and password(s) of administrator(s) preliminarily stored in a storage unit, such as the nonvolatile memory 104 (Step S802).

If they are not administrator's user ID and password (No at Step S802), the CCS 529 sends the received function ID, the received user ID, and the received password to the authentication unit 516 to perform authentication of the user (Step S803).

The determining unit 516a of the authentication unit 516 then determines whether the function ID is the function ID of the printer application software 511, or the ID of the remote access function (Step S804). If the function ID is neither the ID of the printer application software 511 nor the ID of the remote access function (No at Step S804), the result obtaining unit 516b transmits the user ID and the password to the authentication server 300, and receives an authentication result about the transmitted user ID and the transmitted password from the authentication server 300 (Step S805).

The determining unit 516a then determines whether the received authentication result is OK, precisely, the user is authenticated as an authorized user (Step S806). If the authentication result is OK (Yes at Step S806), the restriction-information acquiring unit 516c transmits the user ID and the password to the LDAP server 400 to acquire use restriction information (Step S807).

If it is determined at Step S804 that the function ID is the ID of the printer function or the ID of the remote access function (Yes at Step S804), the restriction-information acquiring unit 516c also transmits the user ID and the password to the LDAP server 400 (Step S807). In other words, when the function ID of the requested function is one of the specific IDs, such as the ID of the printer function or the ID of the remote access function, it can be determined that the user is already authenticated at the client PC 200, accordingly, the authentication processing from Step S804 to Step S806 are omitted.

The restriction-information acquiring unit 516c then receives a log-in result from the LDAP server 400, and determines whether the log-in to the LDAP server 400 is permitted (Step S808). If the log-in is permitted (Yes at Step S808), the restriction-information acquiring unit 516c receives use restriction information associated with the transmitted user ID from the LDAP server 400 (Step S809).

The received use restriction information is sent to the CCS 529. The CCS 529 registers the sent use restriction information into, for example, the MEM-C 117 (Step S810). The notifying unit 529*b* then notifies an authentication request source that the log-in to the multi-function peripheral 100 is permitted (Step S811).

For example, when the printer application software 511 requests authentication of the user, the notifying unit 529*b* notifies the printer application software 511 that the log-in is permitted and printing is executable. By contrast, for example, when the user ID and the password of a user to be authenticated is received via the operation panel 140, the notifying unit 529*b* notifies the SCS 522 that the log-in is permitted. Consequently, a lock applied to the operation panel 140 is released, so that a function that the user is authorized to use among the photocopy function, the scanner function, and the facsimile function, turns available for use. By contrast, for example, when remote access is requested, the notifying unit 529*b* notifies the server daemon that executes the remote access function that the log-in is permitted.

The notifying unit 529*b* refers to respective use restriction information about the functions, and transmits availability of use authority of each function to each application software that executes the function.

If it is determined by the authentication server 300 at Step S806 that the user is not an authorized user (No at Step S806), or if the log-in is not permitted by the LDAP server 400 at Step S808 (No at Step S808), the notifying unit 529*b* notifies the authentication request source that the log-in to the multi-function peripheral 100 is not permitted (Step S812).

If it is determined at Step S802 that the received user ID and the received password are the user ID and the password of an administrator (Yes at Step S802), the notifying unit 529*b* notifies the authentication request source that the log-in is permitted as an administrator authority (Step S813).

In this way, according to the first embodiment, it can be determined whether to perform authentication of a user by using the authentication server 300 in accordance with a category of a function from which the authentication is requested to the authentication unit 516. In other words, when authentication is requested from a function because of which it can be determined that the user is already authenticated at the client PC 200, authentication processing by the authentication server 300 can be omitted.

Figure 9:
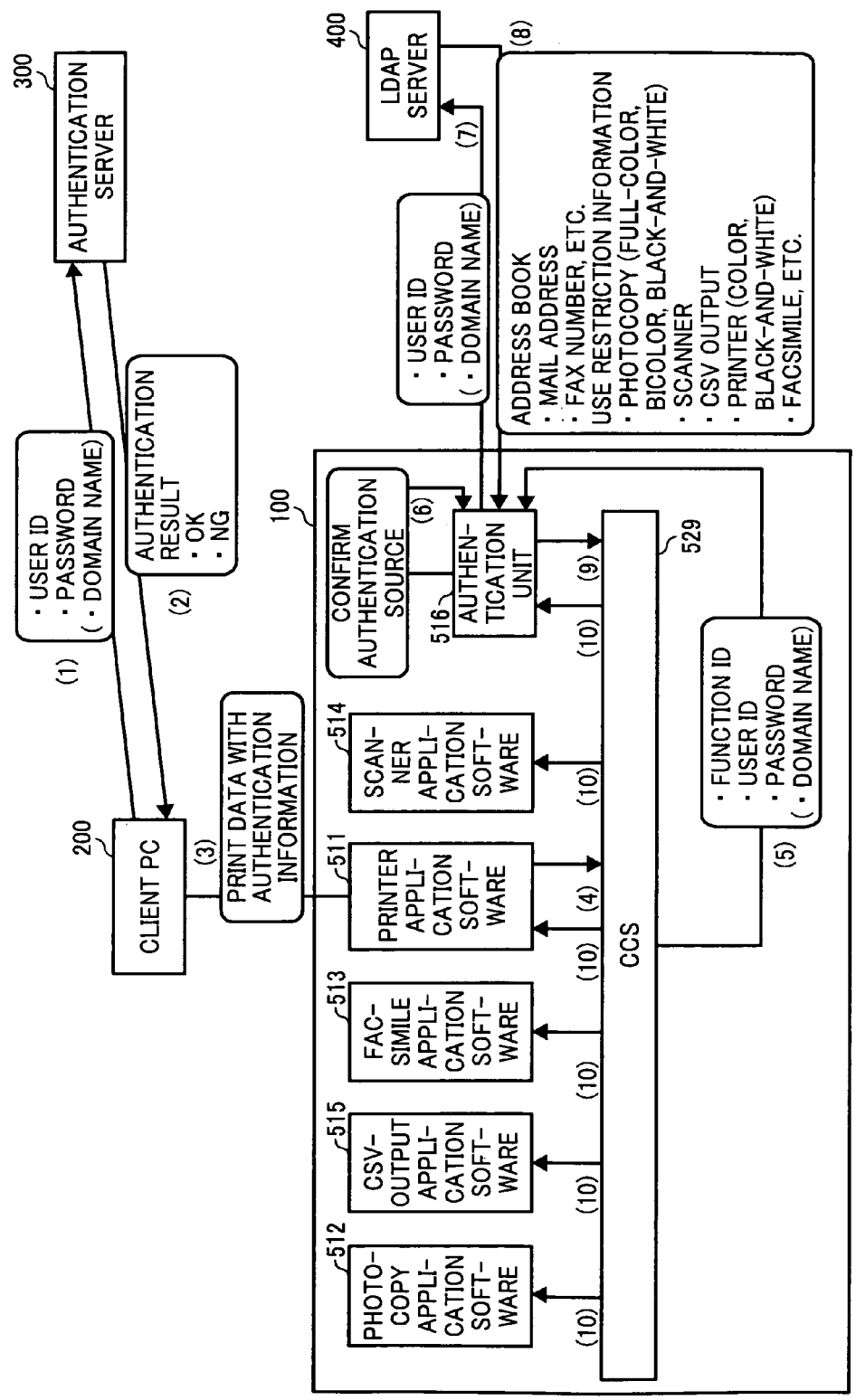
FIG. 9 is a schematic diagram of a concrete example of data to be transmitted and received in the image forming processing according to the first embodiment.

A concrete example of data to be transmitted and received in the image forming processing according to the first embodiment is explained below with reference to FIG. 9. An example of data to be transmitted and received when the client PC 200 requests printing is explained below.

(1) To begin with, the client PC 200 transmits a user ID and a password that are input by a user at log-in, and a domain name as required, to the authentication server 300, and requests authentication of the user.

(2) The authentication server 300 transmits an authentication result to the client PC 200 that requests the authentication. When the user is authenticated, the authentication result is set to, for example, OK; by contrast, when the user is not authenticated, it is set to NG.

(3) The client PC 200 transmits print data to be printed through a printer driver or other software by adding with the user ID and the password, to the printer application software 511 of the multi-function peripheral 100.

(4) The printer application software 511 separates the user ID and the password from the print data, and sends them together with its own function ID to the CCS 529.

(5) The CCS 529 sends the received function ID, the received user ID and the received password to the authentication unit 516.

(6) The authentication unit 516 determines which function requests authentication of the user based on the received function ID.

(7) Furthermore, the authentication unit 516 requests use restriction information about the user by transmitting the user ID and the password to the LDAP server 400.

(8) When the LDAP server 400 is logged in, the LDAP server 400 transmits user information and use restriction information stored therein to the authentication unit 516.

(9) The authentication unit 516 sends the received user information and the received use restriction information to the CCS 529.

(10) The CCS 529 registers the use restriction information into a storage unit, and transmits to application software that executes each function, whether the log-in user has a use authority over each function based on the registered use restriction information.

Thus, in the image forming apparatus according to the first embodiment, the authentication unit, which controls authentication of a user, determines the need for authentication by identifying an authentication request source. Accordingly, it can be avoided that the authentication processing is executed again at log-in to the image forming apparatus despite that the user is authenticated when logging in the client PC, and a processing burden onto the image forming apparatus can be reduced. Moreover, because network traffic between the image forming apparatus and the authentication server generated by repeatedly performing authentication processing can be reduced, a burden on the system can be reduced.

An image forming apparatus according to a second embodiment of the present invention determines the need for authentication by an authentication server in accordance with whether identification information about an authentication server specified in an execution request for a function matches up with identification information about an authentication server used by the image forming apparatus.

Figure 10:
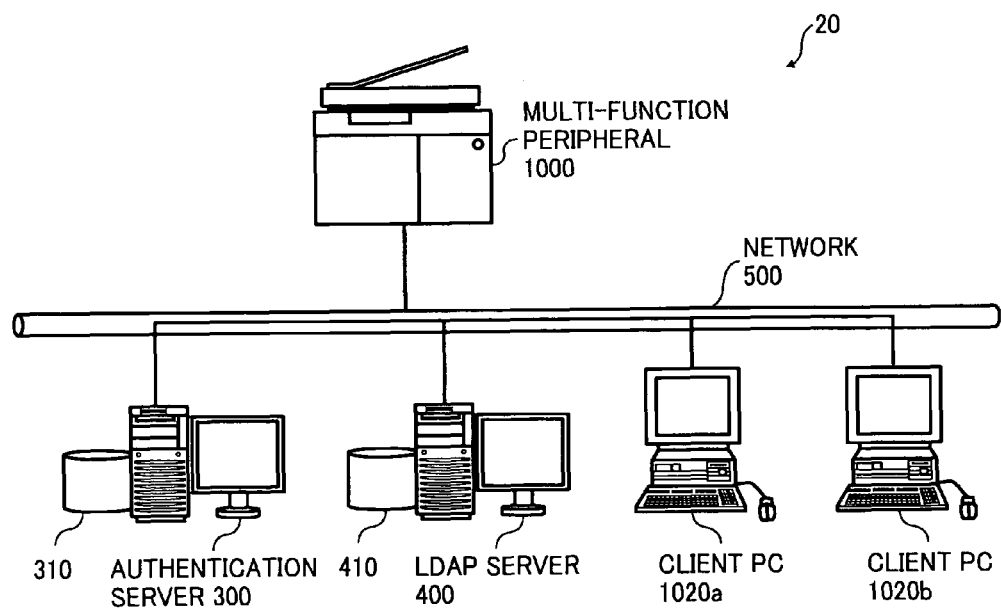
FIG. 10 is a schematic diagram of a network configuration of an image forming system according to a second embodiment of the present invention.

As shown in FIG. 10, an image forming system 20 according to the second embodiment includes a multi-function peripheral 1000, a plurality of client PCs 1020*a* and 1020*b* (hereinafter, "client PC 1020"), the authentication server 300, and the LDAP server 400, which are connected to each other via the network 500.

The configurations of the multi-function peripheral 1000 and the client PCs 1020 are different from those according to the first embodiment. The other configurations and functions are similar to those shown in FIG. 1 that is a schematic diagram of the network configuration of the image forming system 10, therefore, the same components are assigned with the same reference numerals, and explanations of them are omitted.

Figure 11:
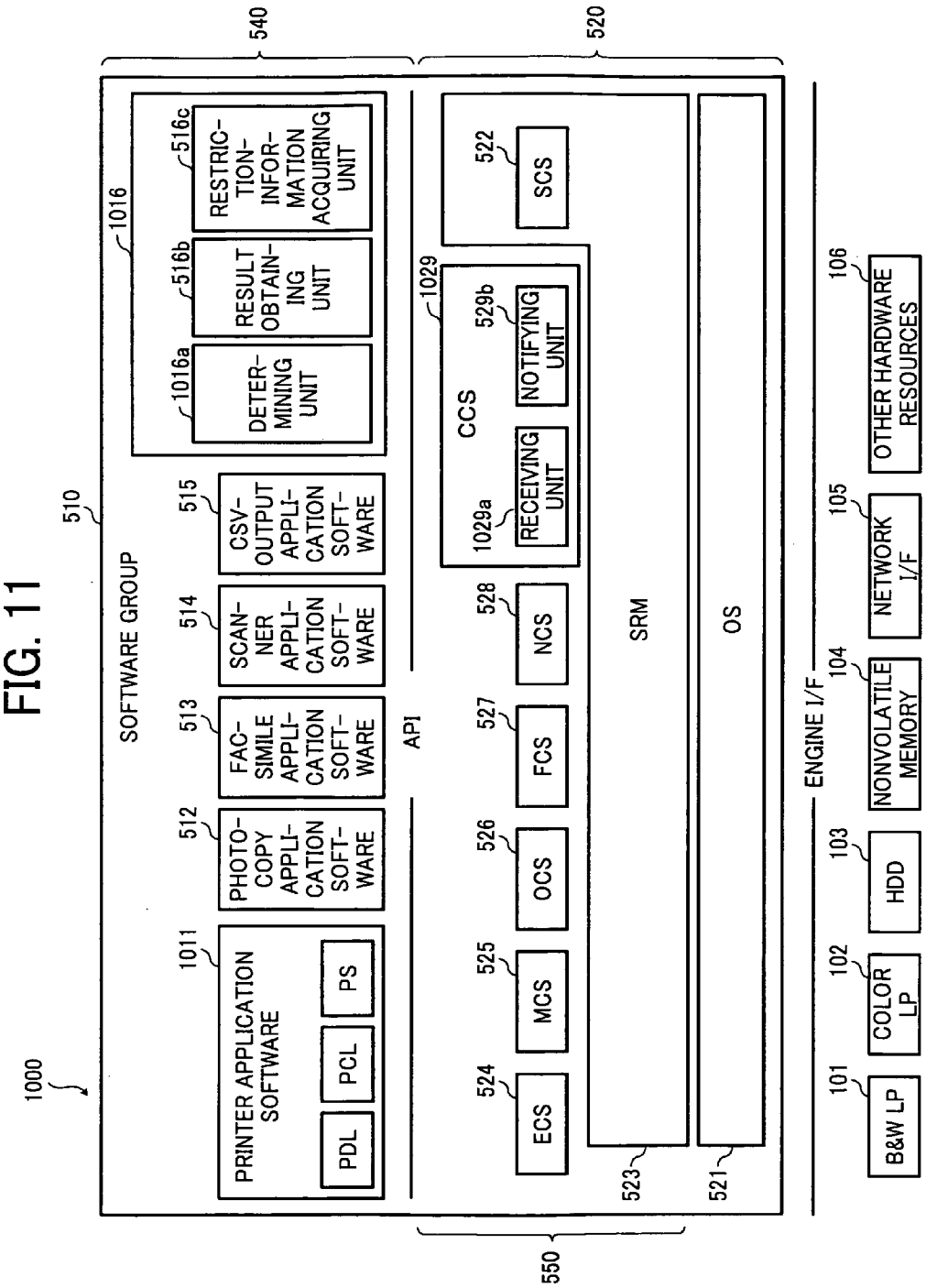
FIG. 11 is a functional block diagram of a general configuration of a multi-function peripheral shown in FIG. 10.

A general configuration of the multi-function peripheral 1000 is explained below with reference to FIG. 11.

The functions of printer application software 1011, a CCS 1029, and a determining unit 1016*a* in an authentication unit 1016 are different from those according to the first embodiment. The other configurations and functions are similar to those shown in FIG. 3 that is a functional block diagram of the multi-function peripheral 100, therefore, the same components are assigned with the same reference numerals, and explanations of them are omitted.

The printer application software 1011 differs from the printer application software 511 in an additional function that the printer application software 1011 separates identification information for identifying an authentication device (hereinafter, "device ID") from print data added with the device ID, and sends the device ID to a receiving unit 1029*a*.

The CCS 1029 receives a device ID from the printer application software 1011 with the receiving unit 1029*a*, and sends the received device ID, a received user ID, and a received password to the authentication unit 1016 for authentication of the user. In other words, the CCS 1029 differs from the CCS 529 in using a device ID instead of a function ID.

The determining unit 1016*a* differs from the determining unit 516*a* in determining the need for authentication by the authentication server 300 in accordance with a device ID notified from the CCS 1029.

Figure 12:
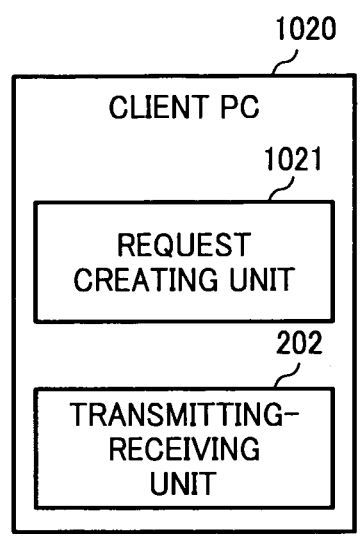
FIG. 12 is a functional block diagram of a client PC shown in FIG. 10.

A configuration of the client PC 1020 is explained below. As shown in FIG. 12, the client PC 1020 includes a request creating unit 1021 and the transmitting-receiving unit 202.

According to the second embodiment, a function of the request creating unit 1021 is different from that according to the first embodiment. The other configurations and functions are similar to those shown in FIG. 4 that is a functional block diagram of the client PC 200 according to the first embodiment, therefore, the same components are assigned with the same reference numerals, and explanations of them are omitted.

The request creating unit 1021 differs from the request creating unit 201 in creating an execution request including a device ID of an authentication device that performs authentication processing at log-in to the client PC 1020. Usually, the request creating unit 1021 creates an execution request including the device ID of the authentication server 300; however, when the authentication processing is performed by an authentication device other than the authentication server 300, the request creating unit 1021 creates an execution request including a device ID of the authentication device.

Any identification information can be used as a device ID, as long as an authentication device can be identified in accordance with the information, such as an Internet protocol (IP) address.

Image forming processing performed by the image forming system 20 configured in this way is explained below. According to the second embodiment, among the three cases, namely, the case (1) when requesting the printer function, the case (2) when requesting the photocopy function, the scanner function, or the facsimile function, and the case (3) of remote access, an example of image forming processing when requesting the printer function is explained below with reference to FIG. 13.

Figure 6:
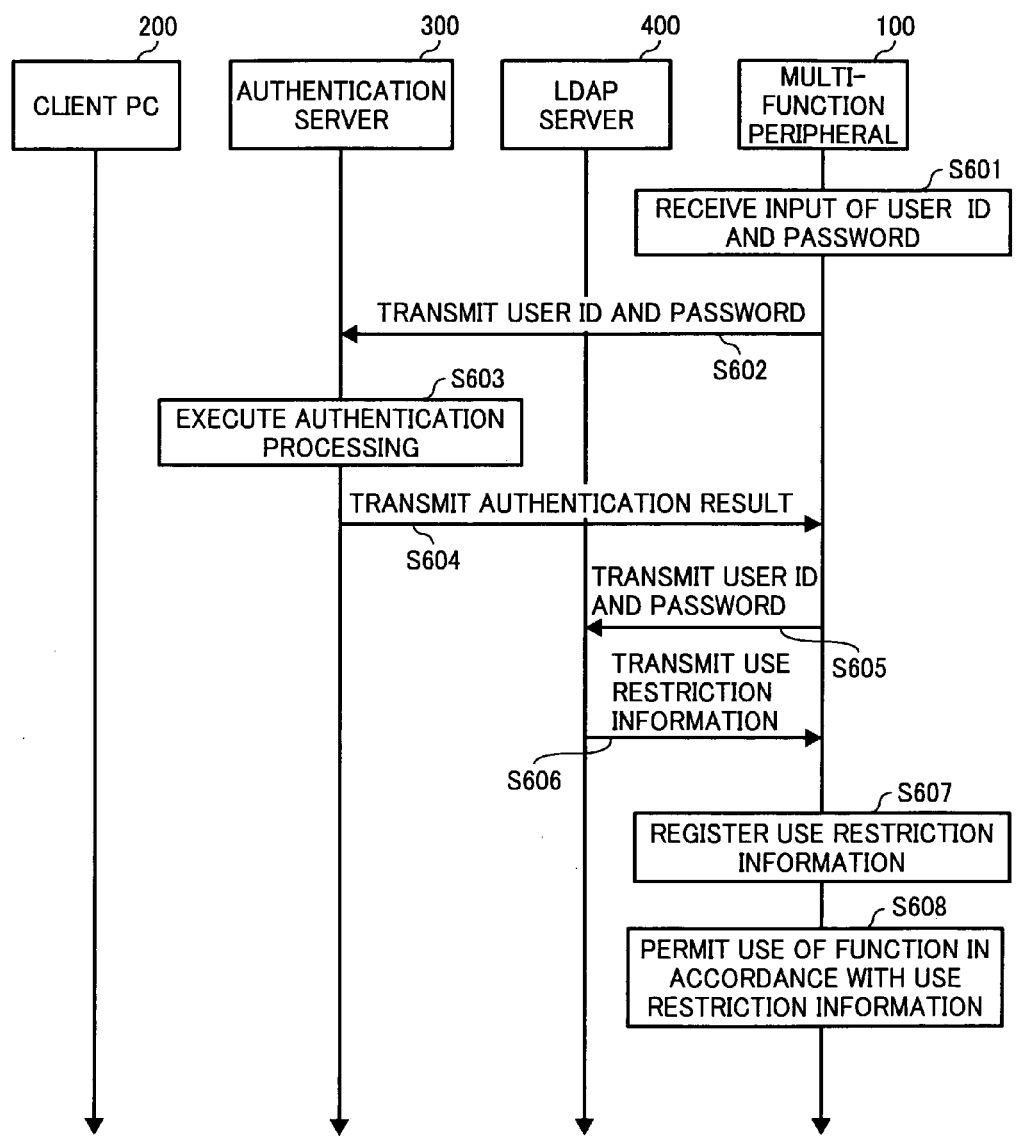
FIG. 6 is a sequence diagram of a general flow of image forming processing when requesting a photocopy function, a scanner function, or a facsimile function according to the first embodiment.

Image forming processing in the case (2) is similar to that shown in FIG. 6 according to the first embodiment, therefore explanations of it are omitted. Image forming processing in the case (3) is different from that shown in FIG. 7 according to the first embodiment only in a point that an execution request includes a device ID similarly to the case (1), therefore explanations of it are omitted.

Processes of user authentication processing from Step S1301 to Step S1304 shown in FIG. 13 are similar to the processes from Step S501 to Step S504 performed by the image forming system 10, therefore explanations of them are omitted.

Suppose when the user is authenticated, the user gives an instruction to print a document through text editor software, the request creating unit 1021 creates an execution request for printing processing in accordance with the printing instruction (Step S1305). According to the second embodiment, the request creating unit 1021 creates an execution request including the device ID of the authentication server 300 that performs authentication at Step S1303, and print data added with the user ID and the password.

The transmitting-receiving unit 202 then transmits the created execution request to the multi-function peripheral 1000 (Step S1306).

The multi-function peripheral 1000 receives the execution request from the client PC 1020. The multi-function peripheral lobo confirms that the device ID included in the execution request matches up with the device ID of the authentication server 300 that is used for authentication at the multi-function peripheral 1000, and determines that authentication by the authentication server 300 is not needed. The multi-function peripheral 1000 then transmits the user ID and the password in the execution request to the LDAP server 400 to acquire use restriction information (Step S1307).

Thus, according to the second embodiment, it is determined whether authentication by the authentication device that the apparatus uses is needed by referring to a device ID of an authentication device included in an execution request, and authentication is executed only when the authentication is needed. Accordingly, repetition of processing can be avoided and a processing burden can be reduced.

Processes of registering and printing use restriction information from Step S1308 to Step S1311 are similar to the processes from Step S508 to Step S511 performed by the image forming system 10, therefore explanations of them are omitted.

Details of log-in processing to the multi-function peripheral 1000 are explained below with reference to FIG. 14.

To begin with, the receiving unit 1029*a* in the CCS 1029 receives a device ID of an authentication device that authenticates the client PC 1020, an input user ID, and an input password (Step S1401). The receiving unit 1029*a* receives the device ID, the user ID, and the password that the printer application software 1011 separates from print data and sends.

The CCS 1029 then determines whether the received user ID and the received password are the user ID and the password of an administrator by verifying them against user ID(s) and password(s) of administrator(s) stored in a storage unit, such as the nonvolatile memory 104 (Step S1402).

If they are not administrator's user ID and password (No at Step S1402), the CCS 1029 sends the received device ID, the received user ID, and the received password to the authentication unit 1016 to perform authentication of the user (Step S1403).

The determining unit 1016*a* of the authentication unit 1016 determines whether the device ID matches up with the device ID of the authentication server 300 that is the authentication device used by the multi-function peripheral 1000 (Step S1404). If the device ID does not match (No at Step S1404), the result obtaining unit 516*b* executes acquisition of an authentication result (Steps S1405 and S1406). In other words, authentication of the user by the authentication server 300 is executed.

By contrast, if the device ID matches (Yes at Step S1404), authentication of the user by the authentication server 300 is omitted, and then acquisition of use restriction information from the LDAP server 400 is executed (Steps S1407 to S1409).

Processes of acquiring authentication result, acquiring use restriction information, and notifying a result from Step S1405 to Step S1411 are similar to the processes from Step S805 to Step S811 performed by the multi-function peripheral 100, therefore explanations of them are omitted.

Thus, according to the image forming apparatus according to the second embodiment, the authentication unit that controls authentication of a user can determine the need for authentication in accordance with whether the device ID of an authentication server that already performs authentication matches up with the device ID of the authentication server that the apparatus uses. Accordingly, it can be avoided that the authentication processing is executed again at log-in to the image forming apparatus despite that the user is authenticated when logging in the client PC, and a processing burden onto the image forming apparatus can be reduced.

An image forming program configured to be executed by the image forming apparatus according to the first and second embodiments are provided by being incorporated in a ROM.

Moreover, the image forming program can be configured to be provided in a file in an installable format or an executable format, by being recorded on a computer readable medium, such as a compact-disk read-only memory (CD-ROM), a flexible disk (FD), a compact disk recordable (CD-R), or a digital versatile disk (DVD).

Furthermore, the image forming program can be configured to be provided by storing it in a computer connected to a network, such as the Internet, and downloading it via the network. Moreover, the image forming apparatus can be configured to be provided or distributed via a network, such as the Internet.

The image forming program has a module configuration that includes the above units (including the application software, and the control services), and as actual hardware, as a central processing unit (CPU) (processor) reads the image forming program from the ROM and executes the image forming program, the above units are loaded on a main memory, and created on the main memory.

According to the embodiments of the present invention, repetition of processing can be avoided, and a processing burden can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus configured to be connected via a network to an authentication device and an electric device, the apparatus comprising:
   an authentication unit configured to execute user authentication process by the authentication device;
   a request receiving unit configured to receive a request for executing a function from the electric device or from the apparatus;
   an executing unit configured to execute a function in response to the request of authenticated user by the authentication device;
   an authentication control unit configured to control and to execute or not to execute the authentication unit before the executing unit executes the function in response to the request received by the request receiving unit, wherein
   when the requested user has already been authenticated at the electric device by the authentication device and the request receiving unit has received the request of the requested user from the electric device, the authentication control unit controls the authentication unit not to execute the user authentication process, and the executing unit executes the function without executing the user authentication process by the authentication control unit controlling the authentication unit.

2. The apparatus according to claim 1, wherein the authentication control unit control to execute the authentication unit or not based on an identification information of the authentication device included in the request.

3. The apparatus according to claim 1, wherein the authentication control unit control to execute the authentication unit or not based on the request requesting to execute the specified function of the plural function.

4. The apparatus according to claim 1, wherein the authentication device is used by the apparatus and the electric device commonly for user authentication.

5. The apparatus according to claim 4, wherein the apparatus is an information forming apparatus.

6. The apparatus according to claim 5, further comprising a display configured to display screen for selecting a request for executing a function, wherein
   when the request is a print function request from the electric device, the executing unit executes the function without executing the user authentication process by the authentication control unit controlling the authentication unit, and
   when the request is at least one of a copy function request and a scan function request on the screen, the executing unit executes the function with executing the user authentication process by the authentication control unit controlling the authentication unit.

7. A network system, comprising:
   an apparatus configured to be connected via a network to an authentication device and an electric device, the apparatus including:
   an authentication unit configured to execute user authentication process by the authentication device;
   a request receiving unit configured to receive a request for executing a function from the electric device or from the apparatus;
   an executing unit configured to execute a function in response to the request of authenticated user by the authentication device;
   an authentication control unit configured to control and to execute or not to execute the authentication unit before the executing unit executes the function in response to the request received by the request receiving unit, wherein
   when the requested user has already been authenticated at the electric device by the authentication device and the request receiving unit has received the request of the requested user from the electric device, the authentication control unit controls the authentication unit not to execute the user authentication process, and, the executing unit executes the function without executing the user authentication process by the authentication control unit controlling the authentication unit.

8. The network system according to claim 7, wherein the authentication control unit control to execute the authentication unit or not based on an identification information of the authentication device included in the request.

9. The network system according to claim 7, wherein the authentication control unit control to execute the authentication unit or not based on the request requesting to execute the specified function of the plural function.

10. The network system according to claim 7, wherein the authentication device is used by the apparatus and the electric device commonly for user authentication.

11. The network system according to claim 10, wherein the apparatus is an information forming apparatus.

12. The network system according to claim 11, further comprising
a display configured to display screen for selecting a request for executing a function, wherein
when the request is a print function request from the electric device, the executing unit executes the function without executing the user authentication process by the authentication control unit controlling the authentication unit, and
when the request is at least one of a copy function request and a scan function request on the screen, the executing unit executes the function with executing the user authentication process by the authentication control unit controlling the authentication unit.

13. A method to process information to be implemented on an apparatus configured to be connected via a network to an authentication device that authenticates users of the apparatus and an electric device that transmits an user's request for using the apparatus, the method comprising:
executing user authentication process by the authentication device;
receiving, by a request receiving unit, a request for executing a function from the electric device or from the apparatus;
executing, by an executing unit, a function in response to the request of authenticated user by the authentication device; and
controlling, by an authentication control unit, to execute or not to execute the authentication unit before the executing unit executes the function in response to the request received by the request receiving unit, wherein
when the requested user has already been authenticated at the electric device by the authentication device and the request receiving unit has received the request of the requested user from the electric device, the authentication control unit controls the authentication unit not to execute the user authentication process, and, the executing unit executes the function without executing the user authentication process by the authentication control unit controlling the authentication unit.

14. The method according to claim 13, wherein the authentication control unit control to execute the authentication unit or not based on an identification information of the authentication device included in the request.

15. The method according to claim 13, wherein the authentication control unit control to execute the authentication unit or not based on the request requesting to execute the specified function of the plural function.

16. The method according to claim 13, wherein the authentication device is used by the apparatus and the electric device commonly for user authentication.

17. The method according to claim 16, wherein the apparatus is an information forming apparatus.

* * * * *